Patented Sept. 12, 1933

1,926,677

UNITED STATES PATENT OFFICE 1,926,677

METHOD FOR THE PREPARATION OF A HYDROCARBON

Ivan Gubelmann and Clyde O. Henke, South Milwaukee, Wis., assignors, by mesne assignments, to Newport Industries, Inc., a corporation of Delaware No Drawing. Application March 18, 1929
Serial No. 348,124

7 Claims. (Cl. 260—168)

This invention relates to a process for the preparation of retene from abietic acid or abietic acid containing materials, more particularly by the catalytic decomposition of abietic acid.

It is an object of this invention to provide a method of obtaining retene from abietic acid in an economically practical manner.

Previously known methods of obtaining retene from abietic acid have employed the step of fusing with sulfur. This method is accompanied by many difficulties.

It is therefore a further object of this invention to provide a method of preparing retene from abietic acid that will constitute an improvement over heretofore known methods.

Other and further important objects of this invention will become apparent from the following description and appended claims.

The present process comprises briefly the passing of a gaseous mixture containing the vapors of abietic acid or volatile material containing the abietic acid radical through a catalytic mass, adapted to effect the decomposition of the abietic acid into the desired product. The gaseous mixture may contain, in addition to abietic acid, steam, air, ammonia, hydrochloric acid gas and the like. Preferably, a mixture consisting principally of steam and abietic acid vapors is employed.

The catalytic mass to be used may be any one of a large number of catalysts which are known to be suitable for similar purposes. The most probable reactions involved are the removal of carbon dioxide, hydrogen and an alkyl group. The use of charcoal is particularly effective in the removal of carbon dioxide, whereas the use of vanadium pentoxide is particularly valuable in effecting a dehydrogenation and a dealkylation. In this process, as in other catalytic processes, a wide variety of different materials may be used as catalysts, and these catalysts may be prepared in a variety of ways. Likewise, mixtures of two or more materials or catalyst supports or carriers may be used. Among the catalysts that we have used may be mentioned, vanadium pentoxide, charcoal, zinc oxide, chromium oxide, manganese oxide, copper oxide, molybdic acid anhydride and others of like nature.

The temperatures employed for the reaction are subject to wide variation. Temperatures of from 410 to 520° C. have been used satisfactorily. The condition of temperature will depend largely upon the catalyst employed and the particular starting material. Preferably, the reaction is carried out at atmospheric pressure, or with just sufficient pressure on the apparatus to cause a flow of vapors through it. However, higher or lower pressures than atmospheric may be employed.

The invention in its broadest aspect comprises the process of producing retene by the catalytic decomposition of abietic acid containing material in the vapor phase. The following examples are given merely by way of illustration and it is to be understood that the invention is not limited to these specific examples.

Example I

Abietic acid is vaporized by passing steam through the molten abietic acid at 240° C. These vapors are brought into contact with vanadium pentoxide by passing the vapors through the catalytic mass. The vanadium pentoxide is held at a temperature of 520° C. The decomposition products are condensed to obtain a product in the form of an oily paste, comprising a mixture of hydrocarbons and some undecomposed abietic acid. This oily paste is separated from the condensed steam and then fractionally distilled in vacuo. The fraction distilling between 190 and 240° C. at a pressure of 4 mm. is collected and recrystallized from acetic acid or alcohol. The crystals obtained have a melting point of 100.6° C. and correspond in analysis to retene.

If instead of abietic acid ethyl abietate is vaporized and contacted with vanadium pentoxide according to the above example, the product obtained is substantially the same from which retene may be isolated as above.

In order to work more efficiently as regards the quantity of raw materials, the other fractions resulting from the distillation and crystallization steps may be further catalytically decomposed as above to give further quantities of retene. If in the above example the catalyst is omitted, no substantial amounts of retene are obtained.

Example II

The vapors of abietic acid as produced in Example I are passed over activated charcoal held at a temperature of 410° C. The vapors are then condensed as described in Example I. The oily mass is separated from the water and fractionally distilled in vacuo. The residue in the still from the distillation is recrystallized from alcohol or glacial acetic acid to obtain retene.

We are aware that many changes may be made in the above examples to produce retene from abietic acid. Other catalysts than those specified in the examples may be employed and various temperatures, depending upon the specific catalyst and starting material may be used. Furthermore, instead of using abietic acid as such, abietic acid containing materials, such as wood or gum rosins, or a purified rosin from the crude rosin may be used. Any of the various isomers of abietic acid which are commonly referred to generically as "abietic acids", for instance sapinic, pyro-abietic, pine-abietic, and pimaric acids, may be used. Furthermore, instead of the acid form, any of its derivatives, such as esters or anhydrides may be used, so long as the derivative retains the property of vaporizing at the temperatures indicated.

We are aware that numerous details of the process may be varied through a wide range without departing from the principles of this invention, and we, therefore, do not purpose limiting the patent granted hereon otherwise than necessitated by the prior art.

We claim as our invention:

1. The process of preparing retene from abietic acid containing material, which comprises vaporizing the abietic acid, passing the vapors into contact with heated vanadium pentoxide at temperatures between 410 to 520° C. and recovering retene from the treated vapors.

2. The process of preparing retene from abietic acid containing material, which comprises vaporizing the abietic acid, passing the vapors into contact with vanadium pentoxide at a temperature of approximately 520° C. and recovering retene from the treated vapors.

3. The process of preparing retene from abietic acid, which comprises vaporizing abietic acid with steam, passing the vapors containing abietic acid into contact with vanadium pentoxide at a temperature of approximately 520° C., condensing the decomposition products to the form of an oily paste, separating the oily paste from condensed steam and fractionally distilling said oily paste in vacuo to obtain retene.

4. The process of preparing retene from abietic acid, which comprises vaporizing abietic acid with steam, passing the vapors containing abietic acid into contact with vanadium pentoxide at a temperature of approximately 520° C., condensing the decomposition products to the form of an oily paste, separating the oily paste from condensed steam, fractionally distilling said oily paste in vacuo to obtain retene and collecting the fraction distilling between 190 and 240° C. at 4 mm. pressure.

5. The process of preparing retene from abietic acid containing material, which comprises vaporizing the abietic acid material, passing the vapors into contact with a catalyst selected from the group consisting of vanadium pentoxide, charcoal, zinc oxide, chromium oxide, manganese oxide, copper oxide and molybdic acid anhydride at temperatures between 410 to 520° C. and recovering retene from the treated vapors.

6. The process of preparing retene from abietic acid, which comprises vaporizing the abietic acid with steam, passing the vapors containing the abietic acid into contact with a catalyst selected from the group consisting of vanadium pentoxide, charcoal, zinc oxide, chromium oxide, manganese oxide, copper oxide, and molybdic acid anhydride at temperatures between 410 to 520° C., condensing the decomposition products to the form of an oily paste, separating the oily paste from condensed steam, and fractionally distilling said oily paste in vacuo to obtain retene.

7. The process of preparing retene from abietic acid, which comprises vaporizing abietic acid with steam, passing the vapors containing the abietic acid into contact with a catalyst selected from the group consisting of vanadium pentoxide, charcoal, zinc oxide, chromium oxide, manganese oxide, copper oxide, and molybdic acid anhydride at a temperature of approximately 520° C., condensing the decomposition products to the form of an oily paste, separating the oily paste from the condensed steam, and fractionally distilling said oily paste to obtain retene.

IVAN GUBELMANN.
CLYDE O. HENKE.